United States Patent

Laskowski et al.

[11] Patent Number: 6,115,520
[45] Date of Patent: Sep. 5, 2000

[54] COMPACT MACH-ZEHNDER INTERFEROMETER AND WAVELENGTH REFERENCE EMPLOYING SAME

[75] Inventors: Edward John Laskowski, Scotch Plains; Dirk Joachim Muehlner, Berkely Heights, both of N.J.

[73] Assignee: Lucent Technologies Inc., Murray Hill, N.J.

[21] Appl. No.: 09/035,317

[22] Filed: Mar. 5, 1998

[51] Int. Cl.[7] .............................. G02B 6/26; G01B 9/02
[52] U.S. Cl. .................... 385/50; 385/14; 385/39; 385/42; 385/130; 385/132; 356/345
[58] Field of Search ................... 385/14, 15, 16, 385/39, 40, 41, 42, 50, 130, 132; 356/345

[56] References Cited

U.S. PATENT DOCUMENTS

| | | | |
|---|---|---|---|
| 4,659,923 | 4/1987 | Hicks, Jr. .................. | 250/227.11 X |
| 4,831,631 | 5/1989 | Haeussler et al. ............... | 372/92 |
| 5,473,459 | 12/1995 | Davis ........................ | 359/183 |
| 5,737,459 | 4/1998 | Epworth et al. ............... | 385/15 |
| 5,778,014 | 7/1998 | Islam ........................ | 372/6 |

*Primary Examiner*—Brian Healy
*Attorney, Agent, or Firm*—Mathews, Collins, Shepherd & Gould, P.A.

[57] ABSTRACT

The present invention includes a MZI comprising a pair of folded waveguides disposed between a pair of couplers. Each folded waveguide comprises a pair of segments intersecting at a reflector. The respective reflectors are different distances from the couplers to provide a major portion of the differential path length between the two arms. In a preferred embodiment, the reflectors are polysilicon mirrors and can be formed by etching through the intersecting waveguides and depositing polysilicon. The result is a compact MZI that can be used as a multiwavelength reference for a laser light source on a common silicon optical bench chip.

9 Claims, 2 Drawing Sheets

COMPACT MACH-ZEHNDER INTERFEROMETER AND WAVELENGTH REFERENCE EMPLOYING SAME

FILED OF THE INVENTION

This invention relates to Mach-Zehnder interferometers ("MZIs") and, in particular, to a compact MZI particularly useful as a wavelength reference.

BACKGROUND OF THE INVENTION

As optical fiber communications channels increasingly replace metal cable and microwave transmission links, integrated optical devices for directly processing optical signals become increasingly important. A particularly useful approach to optical processing is through the use of integrated glass waveguide structures formed on silicon substrates. The basic structure of such devices is described in C. H. Henry et al., "Glass Waveguides on Silicon for Hybrid Optical Packaging", 7 *J. Lightwave Technol.*, pp. 1530–1539 (1989), which is incorporated herein by reference. In essence a silicon substrate is provided with a base layer of $SiO_2$, and a thin core layer of doped silica glass is deposited on the oxide. The core layer can be configured to a desired waveguide structure—typically 4–10 micrometers wide—using standard photolithographic techniques, and a layer of doped silica glass is deposited on the core to act as a top cladding. Depending on the precise configuration of the waveguide, such devices can perform a wide variety of functions such as beam splitting, tapping, multiplexing, demultiplexing and filtering.

Mach-Zehnder interferometers are key components in integrated glass waveguide devices. In essence, a MZI comprises a pair of couplers connected by two waveguides of different length. FIG. 1, which is prior art, illustrates a conventional MZI comprising two waveguides 11 and 12 disposed on a substrate 13 such as silicon. The two waveguides are closely adjacent at two regions 14 and 15 to form two directional couplers (typically 3 dB couplers) which split and recombine light traveling on the two waveguides. The lower waveguide 11, referred to as the lower arm, has an optical path length L. The upper waveguide 12 has a longer path length L+$\Delta$L and a configuration more curved than the lower arm 11.

In operation, the MZI acts as a simple filter. Transmission maxima occur at wavelengths $\lambda_i$ traveling over arms 11 and 12 that reach the output 3 dB coupler 15 with a phase difference $\Delta\phi=2\pi m$ where m is an integer value. Transmission minima occur at $\lambda_j$ where $\Delta\phi$ is an odd multiple of $\pi$. This periodic behavior makes the MZI suitable as a simple optical filter, a wavelength division multiplexer and, as will be shown, a wavelength reference. Sequences of suitably configured MZIs can be used to produce filters of many different characteristics. See U.S. Pat. No. 5,596,661 issued to C. H. Henry et al. on Jan. 21, 1997, which is incorporated herein by reference.

A difficulty with conventional MZIs is that they require relatively long, large areas of substrate surface. To obtain a longer optical pathlength, one of the arms is typically curved. However the amount of curvature is limited by bend loss and dispersive effects. When traversing a curve, light is lost and optical modes are shifted radially outward. A mode loosely bound to the waveguide core (TM) will experience greater loss and a greater outward shift than a mode more tightly bound (TE). As a consequence, radii of curvature are kept large and considerable size is required to achieved desired differential path $\Delta L$.

These geometrical constraints are particularly troublesome for applications of the MZI as a wavelength reference source. Because the MZI is large, the laser light source and the MZI typically must be on separate substrates. But the different substrates, in turn, produce different polarization shifts (due mainly to stress birefringence). Thus the large size requires additional devices to compensate polarization differences. Accordingly there is a need for more compact MZI devices.

SUMMARY OF THE INVENTION

In accordance with the invention, a MZI comprises a pair of folded waveguides disposed between a pair of couplers. Each folded waveguide comprises a pair of segments intersecting at a reflector. The respective reflectors are different distances from the couplers to provide a major portion of the differential path length between the two arms. In a preferred embodiment, the reflectors are polysilicon mirrors and can be formed by etching through the intersecting waveguides and depositing polysilicon. The result is a compact MZI that can be used as a multiwavelength reference for a laser light source on a common silicon optical bench chip.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
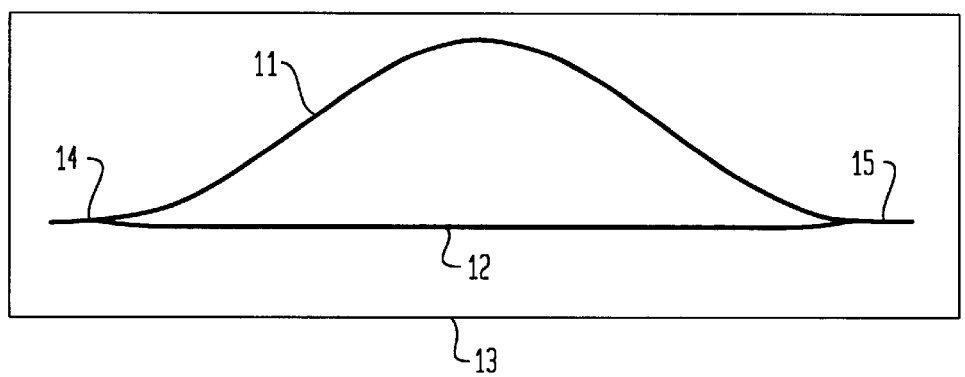
FIG. 1 is a schematic view of a conventional Mach-Zehnder interferometer.
Figure 2:
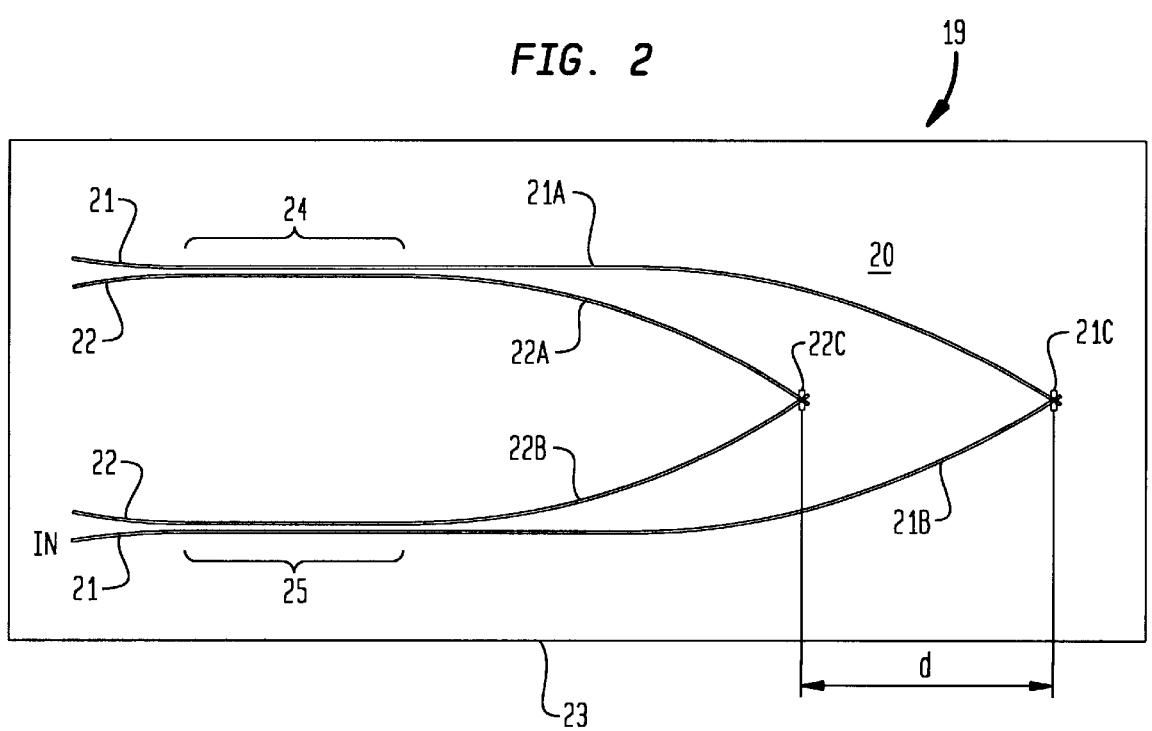
FIG. 2 is a schematic view of a folded MZI in accordance with the invention.

Referring to the drawings, FIG. 2 is a schematic top view of an integrated optical waveguide device 19 including a folded MZI 20 comprising a pair of folded waveguides 21 and 22 disposed upon a substrate 23 such as oxide-coated silicon between a pair of couplers 24 and 25. Folded waveguide 21 comprises at least two waveguide segments 21A and 21B optically coupled together by a reflector 21C. Advantageously the segments intersect at the reflector. Folded waveguide 22 has corresponding similar components 22A–22C. The waveguides 21, 22 extend predominantly in a longitudinal direction, and the reflectors 21C and 22C are preferably separated from one another by a longitudinal distance d along the direction between the couplers and the reflectors. The distance d typically accounts for the major portion of the path length difference $\Delta l$ between waveguides 21 and 22. The couplers 24, 25 are regions where the two waveguides 21, 22 closely approach each other so that there is optical coupling between them. Preferably the approach distance between the waveguides and the length of the coupling regions are chosen to effect 3 dB coupling from one waveguide to the other.

The FIG. 2 structure can be fabricated much as described in the above-cited Henry et al. publication. A silicon substrate is provided with a first layer of $SiO_2$ (typically about 15 μm) grown by high pressure steam oxidation. A core layer of 8% phosphorus doped silica having a thickness in the range 4–8 micrometers is deposited on the oxide using LPCVD. The core layer is then appropriately masked and dry etched, as by RIE, to pattern the core layer into waveguides of desired configuration. The core glass is then annealed, and thereafter a top cladding, such as a 7 μm layer of phosphorus and boron doped silica, is deposited over the waveguide core. Typical waveguide core widths are in the range 4–10 micrometers.

The reflectors 21C and 22C can be formed by etching through the waveguide segments near their intersection and metallizing the cut surfaces. Preferably they are made by depositing polysilicon in the cuts immediately after the waveguides are defined by RIE.

In operation, light entering the input of waveguide 21 passes coupling region 24 where it divides equally between waveguides 21, 22. On each waveguide the light passes along the first segments 21A, 22A until reflected by reflectors 21C, 22C, respectively, to segments 21B, 22B. Because the reflectors are different distances from the coupling regions, the light passing through segments 21B and the light passing through 22B reach the second coupling region 25 at different phases depending on the wavelength. For light arriving in phase (multiples of 2π), transmission is a maximum. For light arriving out of phase, transmission is a minimum. Because a π shift is encountered in coupling from one waveguide to the other, the outputs are complementary.

Figure 3:
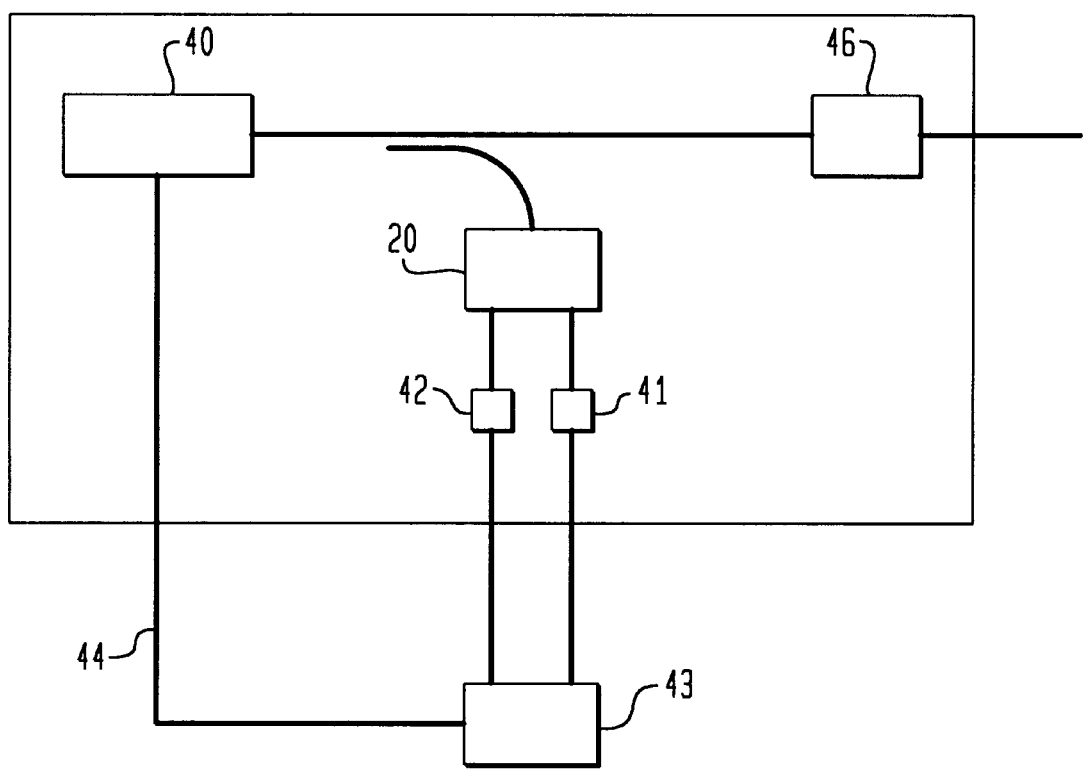
FIG. 3 is a schematic illustration of the use of the FIG. 2 device as a wavelength reference in a multiwavelength light source.

FIG. 3 schematically illustrates a preferred use of the device of FIG. 2 as a wavelength reference in a multiwavelength light source. The input to MZI 20 is a feedback controllable light source 40 such as a multiwavelength laser whose wavelength is to be regulated. The MZI differential delay is chosen so that, at a desired source wavelength, the complementary outputs are at a prescribed ratio e.g., preferably equal. The two outputs are applied to photodiodes 41, 42 and the resulting electrical signals are compared in a comparator 43. A signal representative of the difference is then applied via feedback loop 44 to the source 40, thereby assuring a constant wavelength. In the preferred embodiment, the MZI 20 and the light source 40 are disposed on a common substrate 45. The regulated optical output can be amplified and/or modulated by a separate amplifier/modulator chip 46 disposed on substrate 45. The light source 40 is preferably a multiwavelength light source producing a plurality of spectrally separated wavelengths.

The invention can now be better understood by reference to the following specific example.

EXAMPLE

A device according to FIG. 2 can be fabricated on a silicon substrate using the silicon optical bench techniques (SiOB) described in the previously mentioned Henry et al. article. The two coupler regions can be spaced apart approximately 280 micrometers in the transverse direction and the etched mirror reflectors can be spaced apart approximately 1000 micrometers in the longitudinal direction. The waveguide width at the couplers can be 4.5 μm with a 9 μm center-to-center spacing between waveguides along 900 μm straight-coupling regions. Waveguide thickness is about 6.8 μm, and waveguide bend radii can be 10 mm. The result is a folded MZI having a path difference of about 2 mm resulting in a free spectral range of 100 Ghz.

In a device according to FIG. 3, the exemplary MZI can receive light from a laser to be stabilized at one port in the lower coupler, and both branches of the upper output coupler can be directed to PIN detectors via turning mirrors. The difference of the PIN detector signals provides a signal that passes through nulls every 50 Ghz as the wavelength is varied (with alternating slopes) and so can be used as a multichannel reference for a dense WDM source. The sum of the PIN outputs can be used as a front face power monitor for the laser source.

The primary advantage of the device is its small size compared to conventional waveguide wavelength references. This small size permits the MZI to be placed on the same silicon chip as the laser itself Its tolerance of imperfection in the etched mirrors permits the device to be easily manufactured.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. In a Mach-Zehnder optical interferometer comprising a pair of optical waveguides extending between a pair of optical coupling regions, said waveguides having different optical paths between said coupling regions for producing transmission maxima and minima, the improvement wherein each waveguide of said pair comprises a first segment, a second segment and a reflector optically coupling said first segment and said second segment.

2. The interferometer of claim 1 wherein each waveguide of said pair comprises a first generally longitudinally extending segment and a second longitudinally extending segment and the reflectors of respective waveguides are spaced apart in the longitudinal direction to provide different optical paths between the waveguides.

3. The interferometer of claim 1 wherein said waveguides comprise silica glass waveguides disposed upon a substrate comprising silicon.

4. In an optical interferometer comprising a pair of optical waveguides extending between a pair of optical coupling regions, said waveguides having different optical paths between said coupling regions for producing transmission maxima and minima, the improvement wherein each waveguide of said pair comprises a first segment, a second segment and a reflector optically coupling the first segment and the second segment wherein each said reflector comprises polysilicon.

5. In an optical reference source comprising an electrically controllable optical source, an optical interferometer optically coupled to said optical source, a photodiode for producing an electrical signal indicative of the output of said interferometer, and a feedback circuit for controlling said optical source in accordance with said electrical signal, the improvement wherein said optical interferometer comprises a pair of optical waveguides extending between a pair of optical coupling regions, said waveguides having different optical paths between said coupling regions for producing transmission maxima and minima, and each waveguide of said pair comprises a first segment, a second segment and a reflector optically coupling the first segment and the second segment.

6. The reference source of claim 5 wherein said optical source is a multiwavelength optical source.

7. The reference source of claim 5 wherein said optical source and said interferometer are disposed on a common substrate.

8. The reference source of claim 5 wherein said optical source and said interferometer are disposed on a common substrate comprising silicon.

9. The reference source of claim 5 wherein said optical source, said interferometer and said photodiode are integrally formed on a common substrate comprising silicon.

* * * * *